FREQUENCY CONTROL SYSTEM

Filed Aug. 18, 1959 3 Sheets-Sheet 1

INVENTOR.
JOHANNES J. VANDEGRAAF
BY Isidore Match
ATTORNEY

INVENTOR.
JOHANNES J. VANDEGRAAF

BY Isidore Match

ATTORNEY

INVENTOR.
JOHANNES J. VANDEGRAAF
BY Isidore Match
ATTORNEY

United States Patent Office 2,988,637

Patented June 13, 1961

2,988,637

FREQUENCY CONTROL SYSTEM

Johannes J. Vandegraaf, Lynchburg, Va., assignor to General Electric Company, a corporation of New York Filed Aug. 18, 1959, Ser. No. 834,609
8 Claims. (Cl. 250—20)

Figure 1:
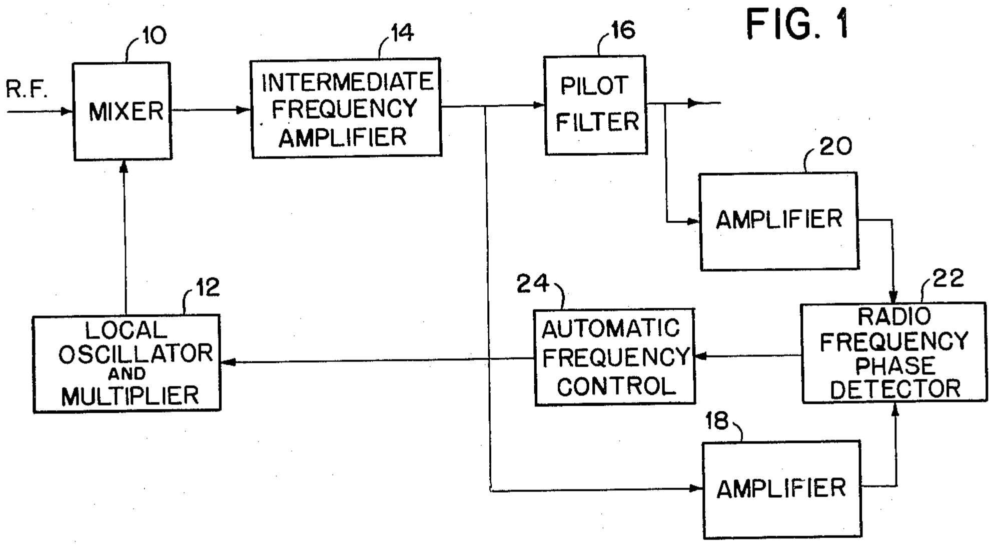

This invention relates to automatic frequency control systems. More particularly, it relates to an automatic frequency control system for a single sideband receiver.

In a single sideband receiver, a pilot signal is generally utilized to furnish the demodulating carrier for the receiver demodulator, the pilot signal generally being attained at the intermediate frequency output by means of a filter having a chosen band pass with a center frequency at the frequency of the pilot signal. In such a system, there is required an automatic frequency control circuit which has to maintain the frequency of the pilot signal centered to within ± a quite small amount of the center frequency of the filter by controlling the frequency of the local oscillator which is utilized in the generation of the intermediate frequency signal. Also, the long-term drift, due to the automatic frequency control circuit itself, has to be small compared to the permissible deviation of the frequency of the pilot signal from the center frequency of the filter.

Heretofore, the technique utilized to effect automatic frequency control in a single sideband receiver has been to compare in a radio frequency phase detector, the amplified intermediate frequency pilot signal and the amplified intermediate frequency pilot signal after it has been passed through a pilot filter having a relatively narrow band pass with a center frequency of the pilot signal. The output of the phase detector is applied to the automatic frequency control apparatus, the output of which is in turn applied to the local oscillator utilized in generating the intermediate frequency pilot signal.

It is evident that any phase drift in such amplifiers and any drift of the phase detector balance will cause an erroneous output from the phase detector. To minimize such drifts, it has been necessary to operate the amplifiers at a low stage gain. This has resulted in a low direct current output from the phase detector and has necessitated the use of a direct current amplifier or an extremely sensitive relay in conjunction therewith.

It is, accordingly, an object of this invention to provide an automatic frequency control circuit which is substantially immune to phase drift in the amplifiers therein and wherein there is substantially zero balance drift of the phase detectors.

It is a further object to provide an automatic frequency control circuit as in the preceding object wherein relatively narrow bandwith circuits permitting higher amplifier stage gains can be utilized.

It is another object to provide a system as in the preceding objects wherein the output from a phase detector utilized to control automatic frequency control apparatus consists of a relatively low frequency alternating current signal instead of a direct current output which can be amplified with good phase stability and an adequate output can readily be obtained to drive automatic frequency control circuits.

Generally speaking and in accordance with the present invention there is provided an apparatus for automatically controlling the frequency of a signal such as one intended to be utilized as a pilot signal. The apparatus comprises filter means having a chosen band pass, the center of this band pass being the frequency of the pilot signal. Means are provided for applying the pilot signal to the filter means. There is also provided a source of signals of a relatively low frequency as compared to the frequency of the pilot signal, the output of the latter source being applied to a sampling circuit to which there is also applied the input and the output of the filter means whereby the sampling circuit provides its output samples of the input to the filter means for a time equal to one-half the cycle of the low frequency signal and samples of the output of the filter means of the next succeeding half cycle of the low frequency signal. The output of the sampling circuit and the output of the filter means are compared in a phase detector whereby for one-half cycle of the low frequency source the output of the filter means is effectively compared with itself and consequently the output of the phase detector provides a reference voltage. In the other half cycle, there is effectively compared in the phase detector the input and the output of the filter means. Thus, with this arrangement there is provided means for establishing a reference voltage and means for ascertaining any change in phase of the signal input to and output of the filter means, a change in phase between the input and output of the filter means being the result of a change in frequency. In the event that there is such a change, the output of the phase detector is a voltage which is greater or less than the reference voltage depending upon the direction of the frequency deviation. The output of the phase detector is converted to a signal having a frequency equal to the frequency of the low frequency sampling signal and such converted signal is compared in phase with the low frequency sampling signal. The result of the latter comparison is a signal having an amplitude and a direction which is a manifestation of any change in frequency of the signal applied to filter means and the direction of such change in frequency, viz., increase or decrease. Such manifesting signal is applied to an automatic frequency control circuit, the output of which is in turn applied to the local oscillator utilized in generating the intermediate frequency pilot signal.

The features of this invention, which are believed to be new, are set forth with particularity in the appended claims. The invention itself, however, may best be understood by reference to the following description when taken in conjunction with the accompanying drawings which show an embodiment of a frequency control system according to the invention.

Figures 2, 5:
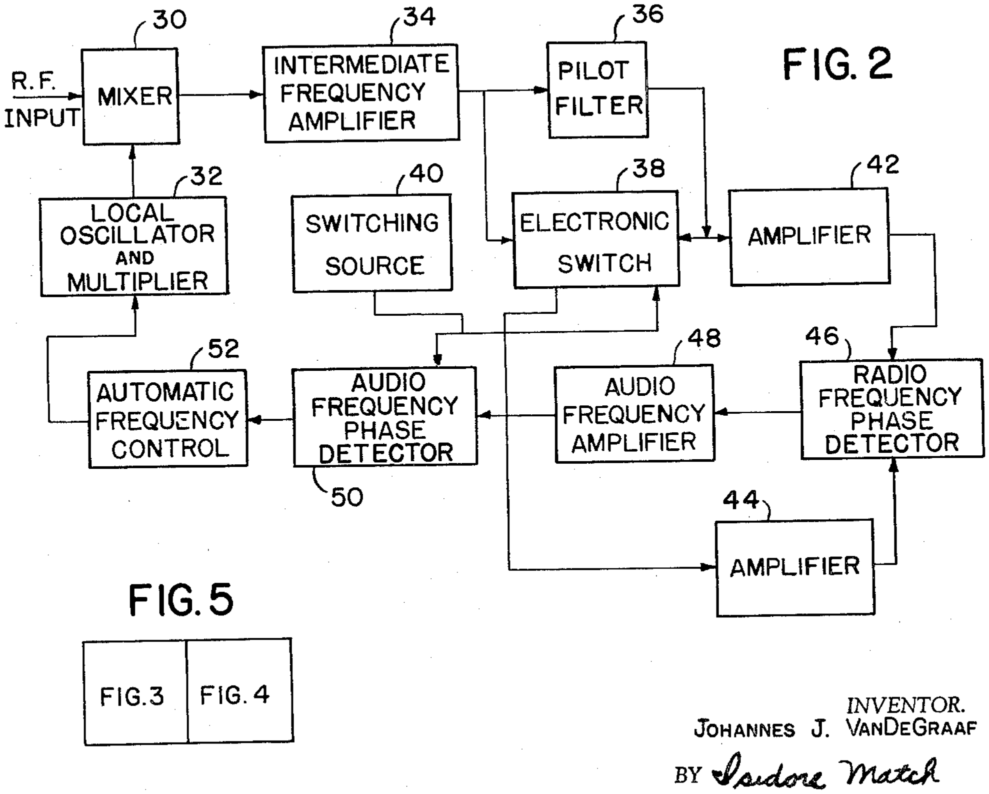
Figure 3:
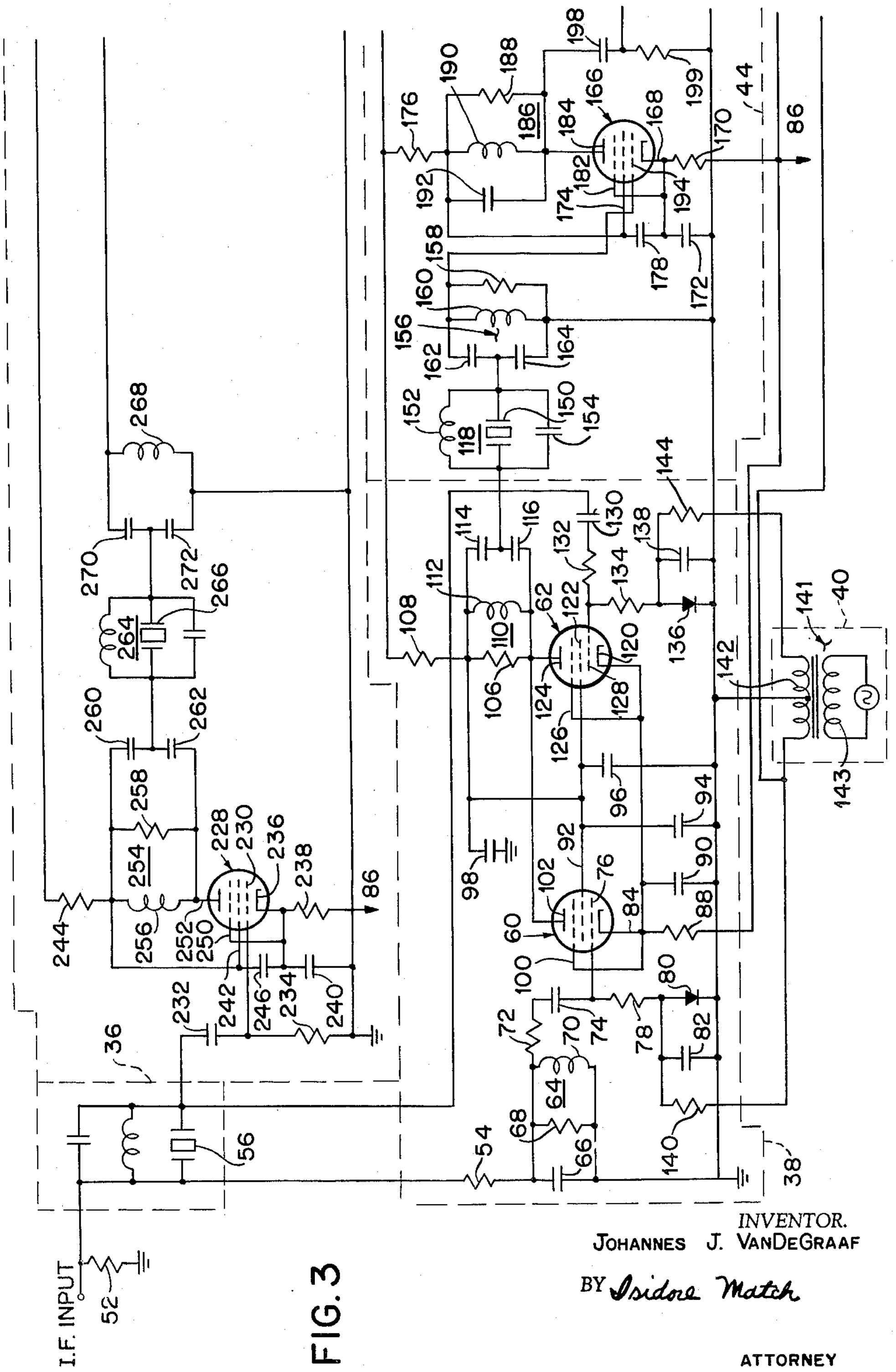
Figure 4:
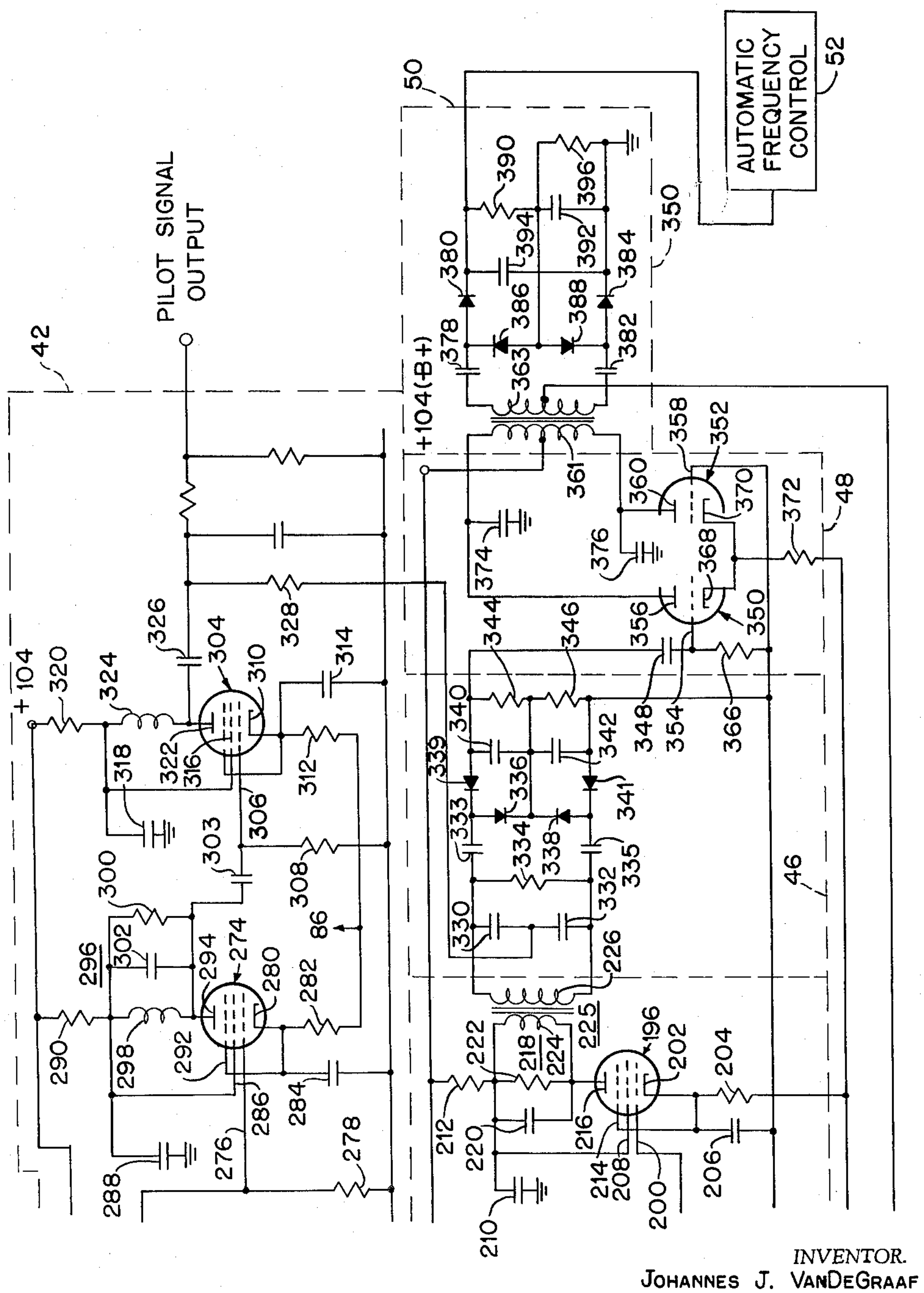

In the drawings, FIG. 1 is a block diagram of a known automatic frequency control system heretofore utilized in certain single sideband receivers;

FIG. 2 is a block diagram of an automatic frequency control system in accordance with the principles of the invention; and, FIGS. 3 and 4 taken together as in FIG. 5 is a schematic diagram of the major portion of the system depicted in block diagram in FIG. 2.

Referring now to FIG. 1, which is a known prior art system of automatic frequency control, the radio frequency signal, including a pilot signal, is applied together with the signal from a local oscillator 12 and multiplier to a mixer 10 wherein there is provided at the output thereof, an intermediate frequency signal which is amplified in an intermediate frequency amplifier 14. The output of intermediate frequency amplifier 14 is simultaneously applied both to the input of a pilot filter 16 and a relatively low gain amplifier 18. Pilot filter 16, where a narrow band pass is desired, may generally comprise a crystal. The output of pilot filter 16 is applied to an amplifier 20 which is also a relatively low gain amplifier and the phases of the output of amplifiers 18 and 20 are compared to a radio frequency phase detector 22. The output of radio frequency phase detector 22 is applied to an automatic frequency control circuit 24, the output of which is, in turn, applied to local oscillator 12 as an error voltage.

It is obvious that any phase drift in amplifier 18 and/or amplifier 20, or drift of the balance of radio frequency phase detector 22 will cause an erroneous output from the phase detector. To minimize this, it has been necessary to operate amplifiers 18 and 20 at a low stage gain. The effect of this type of operation has resulted in a low direct current output from phase detector 22 and it has necessitated the use of a very stable direct current amplifier or an extremely sensitive relay in the output thereof.

To overcome these disadvantages the system of FIG. 2 has been provided in accordance with the principles of the invention. In the system of FIG. 2, similar to that of the system of FIG. 1, a received radio frequency signal containing a pilot signal is applied to a mixer 30 together with the output of a local oscillator and multiplier 32, the output of mixer 30 being amplified in intermediate frequency amplifier 34. The output of intermediate frequency amplifier 34 is applied to the input of a pilot filter 36, filter 36 preferably having a relatively narrow band pass with a center frequency equal to that frequency of the pilot signal. Thus, from the output of filter 36, the pilot signal is selected. The input to and output of filter 36 are both applied to an electronic switch 38. A switching source 40 is provided, the output of which is also applied to electronic switch 38. Switching source 40 may suitably be means for generating a low frequency sine wave such as a 60 c.p.s. wave and electronic switch 38 is a circuit which successively provides samples of the input to the pilot filter 36 throughout one-half the period of a cycle of switching source 40 and samples of the output of pilot filter 36 for a succeeding half cycle of the output of switching source 40. The output of the pilot filter 36 is applied to a relatively high gain amplifier 42 and the output of the electronic switch 38 is applied to a relatively high gain amplifier 44. The outputs of amplifiers 42 and 44 are compared in a radio frequency phase detector 46. It is readily appreciated that for a duration equal to one-half of the period of a cycle of a signal from switching source 40, the output of pilot filter 36 is compared with itself in radio frequency phase detector 46 and for the next succeeding half cycle of the signal from switching source 40, the output of pilot filter 36 is compared with the input thereto. Since, when the output of pilot filter 36 is compared with itself, there is no phase deviation, the output of phase detector 46 during this comparison period is the reference or zero frequency deviation voltage. If there is no phase change between the input and output of the pilot filter, i.e., if the input signal is centered exactly on the center frequency of the filter, the same zero frequency deviation voltage will be provided from the output of radio frequency phase detector 46 during the other half cycle of the signal from switching source 40. However, if the frequency is higher than the center frequency of the filter, phase detector 46 has an output which deviates from the zero deviation voltage in a positive direction and if there is a decrease in the frequency relative to the center frequency of the filter, the output of phase detector 46 is a voltage which is a deviation from the zero deviation voltage in the negative direction. Since these deviations, if any, can only occur at the time of the cycle of switching source 40 when the input to the pilot filter is compared with its output, the output of phase detector 46 when there is a frequency deviation, will substantially approximate a square wave.

At this point, it is not determined which voltage output from phase detector 46 during successive half cycles of the signal from switching source 40 is the reference voltage and which voltage indicates a frequency deviation. To determine this, the output of phase detector 46 is amplified in an audio frequency amplifier, the output of which is tuned to provide maximum gain at the switching frequency. The signal from switching source 40 and the output from audio frequency amplifier 48 are now compared in an audio phase detector 50. It is seen that if there were no frequency change between the input to and the output of pilot filter 36, there is no square wave component in alternating half cycles of the output of audio frequency amplified 48 and the output of audio frequency phase detector 50 will be the zero deviation voltage. However, if there has been a change in phase between the input to and output of filter 36, then audio frequency phase detector 50 provides an output which is different from the zero deviation voltage, a deviation in the positive direction being indicative of an increase in signal frequency at the output of pilot filter 36 and a deviation in the negative direction being indicative of a decrease in frequency in the output of pilot filter 36. The output of audio frequency phase detector 50 then is applied to an automatic frequency control circuit 52, which may conveniently be any such circuit known in the art such as an amplifier, a motor, etc. The automatic frequency control circuit in turn controls the frequency of the local oscillator and multiplier 32.

Referring now to FIGS. 3 and 4, the output from the intermediate frequency amplifier stage 34, shown in FIG. 2, which may be a signal of a relatively high frequency, such as 16 megacycles, is developed across a resistor 52 and applied to the input of pilot filter 36 which may be of a high "Q" type and suitably comprise a crystal 56. The input signal is simultaneously applied to the input of electronic switch 38 through a resistor 54.

Electronic switch 38 comprises a pair of vacuum tubes 60 and 62. In the input circuit of tube 60, there is included a circuit 64 tuned to the frequency of the pilot signal and comprising the parallel arrangement of a capacitor 66, a resistor 68 and an inductor 70. The input signal is applied through resistor 54, tuned circuit 64, a resistor 72, and a capacitor 74 to the control grid 76 of tube 60, grid 76 being returned to ground through a resistor 78 and a diode 80. Diode 80 is shunted by a bypass capacitor 82. The cathode 84 of tube 60 is returned to a source 86 of negative potential through a resistor 88, resistor 88 being bypassed to ground by a capacitor 90. The screen grid 92 is connected to ground through parallel arranged capacitors 94 and 96 and a capacitor 98. The suppressor grid 100 is tied to cathode 84 and the plate 102 is connected to a source 104 of positive potential through resistors 106 and 108. Resistor 106 is one of the branches of a parallel arrangement comprising a tuned circuit 110 tuned to the pilot signal frequency, the latter circuit also comprising an inductor 112 and a series arrangement of a capacitor 114 and a capacitor 116. The output is taken at the junction of capacitors 114 and 116. The arrangement of capacitors 114 and 116 is conveniently utilized as an impedance stepdown arrangement to the input of a crystal filter 118.

The output of filter 36 is connected to the control grid 128 of tube 62 through a capacitor 130 and a resistor 132, control grid 128 being returned to ground through a resistor 134 and a diode 136. Diode 136 is shunted by a bypass capacitor 138. In tube 62, the cathode 120 is tied to cathode 84, the screen grid 122 is connected to screen grid 92, the plate 124 is connected to plate 102 and the suppressor grid 126 is tied to cathode 120.

Applied to control grid 76 of tube 60 through a resistor 140 and resistor 78 is the output at one terminal of the secondary winding 142, grounded at its center, of a transformer 141, the primary winding of transformer 143 being in circuit with a generator for producing a high amplitude signal of a relatively low frequency, say about 60 c.p.s., i.e., switching source 40 (FIG. 2). Applied to control grid 128 of tube 62 through a resistor 144 and resistor 134 is the output at the other terminal of secondary winding 142 of transformer 141.

Due to the presence of diodes 80 and 136 in the respective control grid circuits of tubes 60 and 62, and because the low frequency high amplitude inputs thereto are 180° out of phase with respect to each other, each cycle of output appearing at the junction of capacitors 114 and 116 will be for 180° or one-half of a cycle, the input to filter 36 modulated by one-half of the voltage from switching source 40 and for the other half of the cycle, the output of filter 36 modulated by one-half cycle of the voltage from source 40. Thus, tubes 60 and 62 and their respective associated circuitry function together as an electronic switch for providing alternate 180° duration samplings of the input and of the output respectively of filter 36.

The filter 118 comprising a crystal 150 in parallel arrangement with an inductor 152 and a capacitor 154 is included in the circuit since the input to filter 118 contains the base band frequency components present in the intermediate frequency output and have to be removed when the output appearing at the junction of capacitors 114 and 116 is the modulated unfiltered input signal.

The output of filter 118 is applied through a tuned circuit 156 tuned to the pilot signal frequency to the input of amplifier 44. Tuned circuit 156 comprises a parallel arrangement of a resistor 158, an inductor 160 and series connected capacitors 162 and 164. The output of filter 118 is applied to the junction of capacitors 162 and 164, the latter arrangement serving as an impedance step-up.

Amplifier 44 comprises two amplifier stages connected in cascade. The first stage comprises a vacuum tube 166 having a cathode 168 returned to negative potential source 86 through a resistor 170, resistor 170 being bypassed to ground by capacitor 172; a screen grid 174 connected to positive potential source 104 through a resistor 176 and to ground through a series arrangement of capacitors 178 and 172. The suppressor grid 182 is tied to cathode 168 and the plate 184 connected to the positive potential source 104 through a series arrangement of a circuit 186 tuned to the pilot signal frequency and resistor 176. Tuned circuit 186 comprises a parallel arrangement of a resistor 188, an inductor 190 and a capacitor 192. The output of filter 156 is applied to control grid 194.

The output at plate 184 is applied to the control grid 200 of a tube 196 through a capacitor 198, grid 200 being returned to ground through a resistor 199. The cathode 202 of tube 196 is connected to negative potential source 86 through a resistor 204, resistor 204 being bypassed to ground by a capacitor 206. The screen grid 208 is grounded through a capacitor 210 and is connected to positive potential source 104 through a resistor 212. The suppressor grid 214 is tied to cathode 202 and the plate 216 is connected to positive potential source 104 through a circuit 218 tuned to the signal frequency and through resistor 212. Tuned circuit 218 comprises a parallel arrangement of a capacitor 220, a resistor 222 and an inductor 224. Inductor 224 is in transformer arrangement with an inductor 226, both inductors forming transformer 225. The input to phase detector 46 is developed across inductor 226.

As has been previously described hereinabove in connection with the description of the operation of the block diagram of the system of the invention depicted in FIG. 2, the output of pilot filter 36 is also directly applied to an amplifier 42.

Amplifier 42 comprises a first amplifier stage, the output of which is coupled to a second amplifier stage through a tuned circuit and a crystal filter, the output of the second amplifier stage being coupled through a tuned circuit to a third output amplifier stage. Amplifier 42 is included to give a clean pilot signal output having sufficient amplitude to be utilized in the receiver demodulator and is also the automatic frequency control reference amplifier.

The output of crystal filter 36 is applied to the control grid 230 of a vacuum tube 228 of the first amplifier stage through a capacitor 232, control grid 230 being returned to ground through a resistor 234. The cathode 236 of tube 228 is connected to negative potential source 86 through a resistor 238, resistor 238 being bypassed to ground by a capacitor 240. The screen grid 242 is connected to positive potential source 104 through a resistor 244 and to ground through a capacitor 246 and capacitor 240. The suppressor grid 250 is tied to cathode 236 and the plate 252 is connected to positive potential source 104 through a tuned circuit 254 tuned to the pilot signal frequency and resistor 244. Tuned circuit 254 comprises a parallel arrangement of an inductor 256, a resistor 258, and a series arrangement of a capacitor 260 and a capacitor 262. The output from the first amplifier stage is taken from the junction of capacitors 260 and 262 and applied to a crystal filter 264 comprising a crystal 266 and having a center frequency at the pilot signal frequency. Filter 264 serves to provide a clean pilot signal and the output thereof is applied through a tuned circuit tuned to the pilot signal frequency comprising a parallel arrangement of an inductor 268 and series connected capacitors 270 and 272 to the second amplifier stage. In this connection, the output from filter 264 is connected to the junction of capacitors 270 and 272 and with this arrangement, there is provided the arrangement of an impedance step-down of the input to and an impedance step-up of the output of the filter 264 similar to that provided for crystal filter 118.

The input to the second amplifier stage is applied to the control grid 276 of a vacuum tube 274, control grid 276 being returned to ground through a resistor 278. The cathode 280 of tube 274 is connected to negative potential source 86 through a resistor 282, resistor 282 being bypassed to ground by a capacitor 284. The screen grid 286 is grounded through a capacitor 288 and connected to positive potential source 104 through a resistor 290. The suppressor grid 292 is tied to cathode 280 and the plate 294 is connected to positive potential source 104 through a tuned circuit 296 and resistor 290. Tuned circuit 296 is tuned to the frequency of the pilot signal and comprises a parallel arrangement of an inductor 298, a resistor 300 and a capacitor 302.

The output of tuned circuit 296 is applied through a capacitor 303 to the control grid 306 of a vacuum tube 304 in the third amplifier stage. Control grid 306 is returned to ground through a resistor 308. The cathode 310 of tube 304 is connected to negative potential source 86 through a resistor 312, resistor 312 being bypassed to ground by a capacitor 314. The screen grid 316 is grounded through a capacitor 318 and connected to positive potential source 104 through a resistor 320. The plate 322 is connected to positive potential source 104 through an inductor 324 and resistor 320. The output at plate 322 is applied to phase detector 46 through a capacitor 326 and a resistor 328.

Referring now to phase detector 46, it is to be noted that there is applied thereto the amplified output of pilot filter 36 and the amplified output of electronic switch 38. Since the amplified output of electronic switch 38 contains samplings of the input to pilot filter 36 for a period equal to one-half of the sampling cycle, i.e., one-half the time of a cycle of the signal from switching source 40, and it contains samplings of the output of pilot filter 36 for a period also equal to one-half of the sampling cycle, in phase detector 46 for one-half period of such sampling cycle, the amplified output of pilot filter 36 is compared with itself and thus, for such period the output of phase detector 46 is a zero phase shift reference direct current voltage output (for example, zero volts output). During the other half of the sampling cycle, the sampled amplified input to pilot filter 36 is compared with its amplified output. If there is no phase shift between the input to and the output of filter 36, the direct current output of phase detector 36 should be the same as when the output of filter 36 is compared with itself. If, however, there is a phase shift between the filter input and the filter output, the direct current output of phase detector 36 changes depending upon whether the shift is positive or negative, i.e., the pilot signal frequency is high or low with respect to what it should be and how far it is off from such frequency. Thus, the output of phase detector 46 in the latter situation contains a square wave alternating current component at the frequency of switching source 40.

Phase detector 46 comprises the secondary winding 226 of transformer 225 for providing the output of amplifier 44 as an input thereto. Shunting winding 226 there is a series arrangement of capacitors 330 and 332, a resistor 334, a series arrangement of oppositely poled diodes 336 and 338, a series arrangement of capacitors 340 and 342 and a series arrangement of resistors 344 and 346. Connected between the junction of the anode of diode 336 and one end of resistor 334 is a capacitor 333 and connected between the junction of the other end of resistor 334 and the anode of diode 338 is a capacitor 335. Series connected diodes 339 and 341 are provided and poled as shown.

The output from the plate of the third stage of amplifier 42 is applied to the junction of capacitors 330 and 332. Since at this point, it cannot be known as to which voltage output from phase detector 46 is the reference voltage and thus, the direction of any frequency deviation therefrom the phase of output of phase detector 46 relative to the phase of the output of electronic switch 38 is utilized to provide the necessary information as to the direction of the frequency deviation relative to the center frequency of the pilot filter. Therefore, by comparing these phases in a second phase detector, a direct current voltage output is obtained which is indicative of the direction and magnitude of frequency shift of the pilot signal.

The output from phase detector 46 is applied to audio frequency amplifier 48 through a capacitor 348. Audio amplifier 348 comprises vacuum tubes 350 and 352 suitably contained in a single envelope, the output of phase detector 46 being applied to the control grid 354 of tube 350 through capacitor 348. In tubes 350 and 352, plate 356 and 360 are connected to the positive potential source 104 through a center tap on the primary winding 361, grid 354 is returned to ground through a resistor 366 and grid 358 is directly connected to ground. Cathodes 368 and 370 are connected to negative potential source 86 through a common resistor 372.

The outputs from audio amplifier 48 and from switching source 40 are combined in audio frequency phase detector 50. Phase detector 50 comprises secondary winding 363, the upper terminal of secondary winding 363 being connected in series with a capacitor 378 and a diode 380 poled as shown, the lower terminal of secondary winding also being connected in series with a capacitor 382 and a diode 384 poled in the same direction as diode 384. Connected between the junction of capacitor 378 and diode 380 and the junction of capacitor 382 and diode 384 is a series arrangement of oppositely poled diodes 386 and 388. Connected across the diodes 386 and 388 is a series arrangement of a resistor 390 and a capacitor 392, a parallel connected capacitor 394 being provided between the junction of the cathode of diode 380 and one terminal of resistor 390, and the junction between the cathode of diode 384 and the low side of capacitor 392. Capacitor 392 being shunted by a resistor 396 which is connected to ground.

It is apparent that if the output from phase detector 46 is zero, i.e., the voltage output for each half of the sampling cycle is the same. Then, when the output of audio frequency amplifier 48 is combined with the output from the switching source 40, the output of phase detector 50 is also a zero deviation voltage. However, let it be assumed that the output from crystal filter 36 has a phase shift with respect to its input corresponding to an increase in frequnency relative to the center frequency of the filter, then, the output of phase detector 46 is positive and such positive output is reflected in the output of audio amplifier 48. In the same manner, if the output of crystal filter 36 is a frequency lower than the input thereto, this will also be reflected in the output of audio amplifier 48 in the negative direction. Thus, by comparing the phase of the output of audio frequency amplifier 48 in phase detector 50 with the output from switching source 40, an output is obtained which is indicative of the direction and magnitude of the frequency shift through filter 36.

The output of phase detector 50 is now applied to the automatic frequency control stage 52 as explained previously to start a motor or other similar device contained therein, as is necessary.

It is thus seen, that the invention described herein is substantially immune to phase drifts in amplifiers 42 and 44 and to zero balance drift of the phase detector 46. Drift in these circuits can only effect the direct current balance of the phase detector and not the alternating current balance. The output of the phase detector 50 is an audio frequency and this signal can be amplified with excellent phase stability and adequate output can readily be obtained to drive the automatic frequency control circuits. The frequency of switching source 40 can be conveniently chosen to be the line voltage frequency, viz., 60 cycles which is readily obtained. Narrow band circuits which permit higher stage gains can be used in amplifiers 42 and 44.

Instead of phase detector 50, a two phase motor may be driven to provide frequency correction to the local oscillator.

While there has been shown a particular embodiment of this invention, it will, of course, be understood that it is not wished to be limited thereto since different modifications may be made both in the circuit arrangements and in the instrumentalities employed, and it is comtemplated in the appended claims to cover any such modifications as fall within the true spirit and scope of the invention.

What is claimed as new and desired to secure by Letters Patent of the United States is:

1. In a circuit including means for generating a signal having a chosen frequency, means for automatically controlling the frequency of said signal at said chosen frequency comprising means for comparing the phase of said signal at a given point in said circuit with itself to derive a first reference voltage substantially representative of a zero deviation from said chosen frequency and for comparing the phase of said signal at said given point with the phase of said signal at a different point in said circuit to derive a second voltage, and means for applying the difference between said first and second voltages to said signal generating means as a correction voltage.

2. In a circuit including signal generating means and means for selecting from the output of said signal generating means, a signal having a chosen frequency, means for automatically substantially maintaining said signal at said chosen frequency comprising means for comparing the output of said signal selecting means with itself to derive a first reference voltage usbstantially representative of zero frequency deviation from said chosen frequency and for comparing the input to and the output of said selecting means to derive a second voltage, and means for applying the difference of said first and second voltages to said signal generating means as a correction voltage.

3. In a circuit including signal generating means and filter means responsive to the output of said signal generating means for selecting therefrom a signal having a chosen frequency, means for automatically substantially maintaining said signal at said chosen frequency comprising means coupled to the output of said filter means for alternately comparing the output of said filter means with itself to derive a first reference voltage substantially representative of zero deviation from said chosen frequency and for comparing the input to said filter means with the output of said filter means to derive a second voltage, and means for applying the difference between said first and second voltages to said signal generating means as a correction voltage.

4. In a circuit including generating means and filter means for selecting from the output of said signal generating means a signal having a chosen frequency, means for automatically maintaining said signal at said chosen frequency comprising phase comparison means, means for applying the output of said filter means to said phase comparison means, means for applying samplings of the input to and the output of said filter means to said phase comparison means for alternating equal durations, the comparison of the output of said filter means with samplings of the output of said filter means over said given duration providing a first voltage substantially representative of zero deviation from said chosen frequency, the comparison of the output of said filter means with samplings of the input to said filter means over said duration providing a second voltage and means for applying the difference between said first and second voltages to said signal generating means as a correction voltage.

5. In a circuit including signal generating means and filter means coupled to the output of said signal generating means for selecting therefrom a signal having a chosen frequency, means for automatically substantially maintaining said selected signal at said chosen frequency comprising phase comparison means, means for providing samplings of the input to and the output of said filter means for alternately occurring equal durations, means for applying the output of said filter means to said phase comparison means, means for applying the output of said sampling means to said phase comparison means, the simultaneous application of the output of said filter means and the samplings of the output of said filter means to said phase comparison means providing at the output of said phase comparison means a voltage substantially representative of zero deviation from said chosen frequency, the simultaneous application of the output of said filter means and the samples of the input of said filter means to said phase comparison means providing a second voltage and means for applying the difference between said first and second voltages to said signal generating means as a correction voltage.

6. In a circuit including signal generating means and filter means coupled to the output of said generating means for selecting therefrom a signal having a chosen frequency, means for substantially maintaining said signal at said chosen frequency comprising phase comparison means, means for sampling the input to and the output of said filter means for alternately occurring equal durations, means for applying the output of said filter means to said phase comparison means, means for applying the output of said sampling means to said phase comparison means, the simultaneous application of the output of said filter means and samples of the output of said filter means to said phase comparison means providing a voltage substantially representative of zero deviation from said chosen frequency, the simultaneous application of the output of said filter means and the samples of said input to said filter means providing a second voltage, means responsive to the output of said phase comparison means for providing a voltage substantially representative of the difference in the direction between the frequency at the input to and the output of the said filter means and means for applying the output of said last named means to said signal generating means as a correction voltage.

7. In a circuit including signal generating means and filter means coupled to the output of said signal generating means for selecting therefrom a signal having a chosen frequency, means for automatically substantially maintaining said signal at said chosen frequency comprising means for generating a switching signal having a frequency substantially less than said chosen frequency, means coupled to the input and output of said filter means and to the output of said switching signal generating means for providing samples of the input to and the output of said filter means during alternate half cycles of said switching signal, first phase comparison means, means for applying the output of said filter means to said first phase comparison means, means for applying the output of said sampling means to said first phase comparison means, the simultaneous application of the output of said filter means and the samples of the output of said filter means to said phase comparison means providing a first voltage substantially representative of zero deviation from said chosen frequency, the simultaneous application of the output of said filter means to said phase comparison means and the samples of the input to said filter means to said phase comparison means providing a second voltage at the output of said phase comparison means, means responsive to the output of said first phase comparison means for converting the output thereof to a voltage having a frequency equal to the frequency of said switching signal, second phase comparison means coupled to the output of said last named means and said switching signal generating means, and means for applying the output of said second phase comparison means to said signal generating means as a correction voltage.

8. In a circuit as defined in claim 7 wherein said filter means comprises a crystal filter having a relatively narrow band pass and wherein the center frequency of said band is said chosen frequency.

References Cited in the file of this patent

UNITED STATES PATENTS

| | | |
|---|---|---|
| 2,698,904 | Hugenholtz | Jan. 4, 1955 |
| 2,808,509 | Felch et al. | Oct. 1, 1957 |
| 2,896,169 | Howell | July 21, 1959 |
| 2,916,545 | Baugh | Dec. 8, 1959 |